(12) United States Patent
Wang et al.

(10) Patent No.: US 10,395,335 B2
(45) Date of Patent: Aug. 27, 2019

(54) OPTIMAL DATA SAMPLING FOR IMAGE ANALYSIS

(71) Applicant: INTERNATIONAL BUSINESS MACHINES CORPORATION, Armonk, NY (US)

(72) Inventors: Hongzhi Wang, San Jose, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 15/470,721

(22) Filed: Mar. 27, 2017

(65) Prior Publication Data
US 2018/0276785 A1    Sep. 27, 2018

(51) Int. Cl.
| G06K 9/00 | (2006.01) |
| G06T 1/20 | (2006.01) |
| G06T 3/40 | (2006.01) |
| G06N 20/00 | (2019.01) |

(52) U.S. Cl.
CPC .............. *G06T 1/20* (2013.01); *G06N 20/00* (2019.01); *G06T 3/40* (2013.01)

(58) Field of Classification Search
CPC ............ G06T 1/20; G06T 3/40; G06N 99/005
USPC ........................................................ 382/299
See application file for complete search history.

(56) References Cited

U.S. PATENT DOCUMENTS

| 6,023,535 | A | 2/2000 | Aoki | |
| 9,418,283 | B1* | 8/2016 | Natarajan | .......... G06K 9/00463 |
| 2012/0300227 | A1* | 11/2012 | Ohk | .................. G06K 9/38 |
| | | | | 358/1.2 |
| 2012/0324397 | A1* | 12/2012 | Patz | .................... G06F 19/321 |
| | | | | 715/800 |
| 2015/0371431 | A1 | 12/2015 | Korb et al. | |
| 2018/0253621 | A1* | 9/2018 | Banerjee | ............... G06T 1/0007 |

OTHER PUBLICATIONS

Winters, N. et al., "Information Sampling for Optimal Image Data Selection", 1999, pp. 1-9, European Union RTD—Future and Emerging Technologies Projection, Google.com, United States.
Siemens, et al., "Double Aperture Camera System for High Resolution Measurement", Jun. 10, 2010, pp. 1-4, Siemens AG 2010, ip.com, United States.
Anonymously, "System and Method for using Very Fast Database Sampling to reduce overhead and time in using production data for performance evaluation purposes", Sep. 24, 2014, pp. 1-6, IP.com, United States.
Anonymously, "Efficient License Plate Recognition Using Image Quality Information", Jul. 21, 2014, pp, 1-8, IP.com, United States.

(Continued)

*Primary Examiner* — Van D Huynh
(74) *Attorney, Agent, or Firm* — Sherman IP LLP; Kenneth L. Sherman; Hemavathy Perumal (57) ABSTRACT

One embodiment provides a method comprising receiving image data with a first image resolution, and determining an optimal image resolution for sampling the image data based on a learned model. The optimal image resolution is lower than the first image resolution. The method further comprises sampling the image data at the optimal image resolution, and performing image analysis on sampled image data resulting from the sampling.

20 Claims, 8 Drawing Sheets

(56) References Cited

OTHER PUBLICATIONS

Rohlfing, T. et al., "Evaluation of atlas selection strategies for atlas-based image segmentation with application to confocal microscopy images of bee brains", NeuroImage, Jul. 17, 2003, pp. 1-15, Elsevier, United States.

Aljabar, P. et al., "Multi-atlas based segmentation of brain images: Atlas selection and its effect on accuracy", NeuroImage, Jul. 1, 2009, pp. 1-15, vol. 46, No. 3, Elsevier, United States.

Asman, A.J. et al,, "Multi-atlas Learner Fusion: An efficient segmentation approach for large-scale data", Dec. 2015, pp. 1-29, Med Image Anal., United Status.

Coupe, P. et al., "Patch-based segmentation using expert priors: Application to hippocampus and ventricle segmentation", NeuroImage, 2011, pp. 940-954 Elsevier, United States.

Sanroma, G. et al., "Learning to Rank Atlases for Multiple-Atlas Segmentation", Proceedings of the IEEE Transactions on Medical Imaging, 30 May 2014, pp. 1-17, vol. 33, Issue 10, IEEE, United States Langerak, T.R. et al., "Multiatias-based segmentation with preregistration atlas selection", Sep. 2013, Medical Physics, pp. 1-8, vol. 40, No. 9, United States.

List of IBM Patents or Patent Applications Treated as Related; Wang, H., et al., U.S. Appl. No. 16/428,764, filed May 31, 2019.

* cited by examiner

OPTIMAL DATA SAMPLING FOR IMAGE ANALYSIS

The present invention generally relates to image analysis, and more particularly, to optimal data sampling for image analysis.

BACKGROUND

Image analysis is an important type of big data analytics. Examples of different applications requiring image analysis include, but are not limited to, medical image analysis (e.g., anatomy segmentation, computer aided diagnosis), general three-dimensional (3D) image analysis (e.g., surveillance video analysis), and two-dimensional (2D) image analysis (e.g., scene reconstruction, event detection, object recognition).

SUMMARY

One embodiment provides a method comprising receiving image data with a first image resolution, and determining an optimal image resolution for sampling the image data based on a learned model. The optimal image resolution is lower than the first image resolution. The method further comprises sampling the image data at the optimal image resolution, and performing image analysis on sampled image data resulting from the sampling.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to image analysis, and more particularly, to optimal data sampling for image analysis. One embodiment provides a method comprising receiving image data with a first image resolution, and determining an optimal image resolution for sampling the image data based on a learned model. The optimal image resolution is lower than the first image resolution. The method further comprises sampling the image data at the optimal image resolution, and performing image analysis on sampled image data resulting from the sampling.

For expository purposes, the term "original image" as used herein generally refers to an image that is unaltered/unmodified via data sampling (i.e., in its original form).

Image analysis of image data is time-consuming and resource-intensive. For example, image analysis of images with high resolution may be expensive as it is resource intensive (e.g., results in high consumption of computation resources such as central processing units (CPUs), memory, etc.) and results in long execution time. Sampling image data may dramatically reduce both time and resource consumption, but negatively impact accuracy of image analysis. For example, sampling high resolution images to low resolution images may reduce the cost of image analysis (i.e., make it cheaper), but compromise accuracy of the image analysis.

One embodiment proposes a system and a method for determining an optimal resolution for image data that achieves ideal trade-offs between accuracy and cost (e.g., execution time, resource consumption, etc.) of image analysis, and irreversibly compressing (i.e., sampling) the image data in accordance with the optimal resolution determined.

Figure 1A:
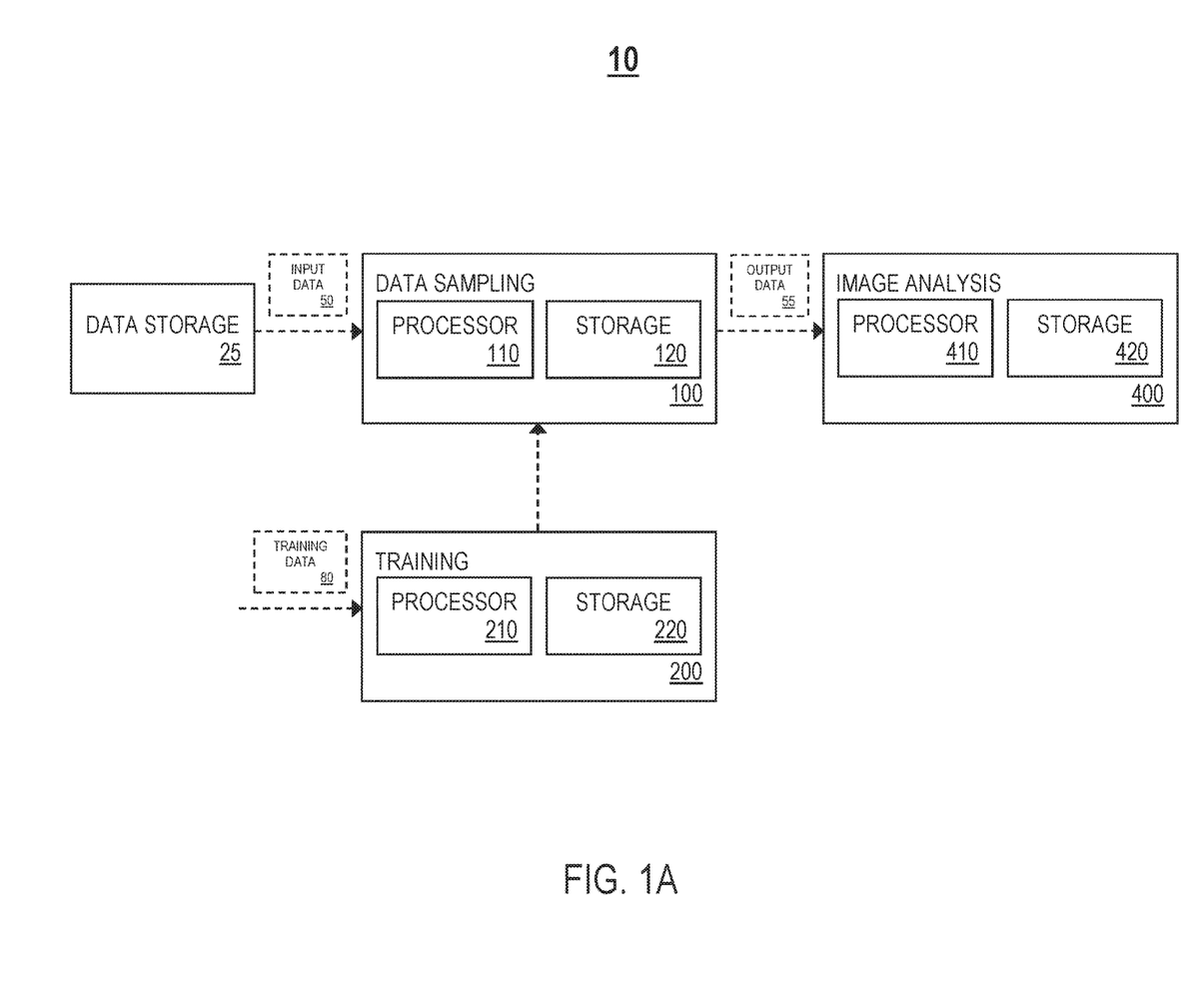
FIG. 1A illustrates an example computer framework for implementing optimal data sampling for image analysis, in one or more embodiments.

FIG. 1A illustrates an example computer framework 10 for implementing optimal data sampling for image analysis, in one or more embodiments. The computer framework 10 comprises, but is not limited to, at least one of the following: (1) a training system 200 including computation hardware such as, but not limited to, one or more processor devices 210 and one or more storage devices 220, (2) a data sampling system 100 including computation hardware such as, but not limited to, one or more processor devices 110 and one or more storage devices 120, and (3) an image analysis system 400 including computation hardware such as, but not limited to, one or more processor devices 410 and one or more storage devices 420. As described in detail later herein, one or more applications may execute/operate on the one or more processor devices 210 of the training system 200 to create, initialize, and train a learned sampling model based on training data 80. One or more applications may execute/operate on the one or more processor devices 110 of the data sampling system 100 to perform a data sampling process on image data based on a learned sampling model (e.g., the learned sampling model trained by the training system 200). One or more applications may execute/operate on the one or more processor devices 410 of the image analysis system 400 to perform one or more image analysis processes on image data (e.g., sampled image data resulting from the data sampling process performed by the data sampling system 100).

In one embodiment, the data sampling system 100, the image analysis system 400, and/or the training system 200 reside on the same device (e.g., a server device, a mobile electronic device such as a tablet, a smart phone, a laptop, etc.). In another embodiment, the data sampling system 100, the image analysis system 400, and/or the training system 200 reside on different devices. For example, relative to the data sampling system 100, the image analysis system 400 and the training system 200 may reside on remote server devices.

Figure 1B:
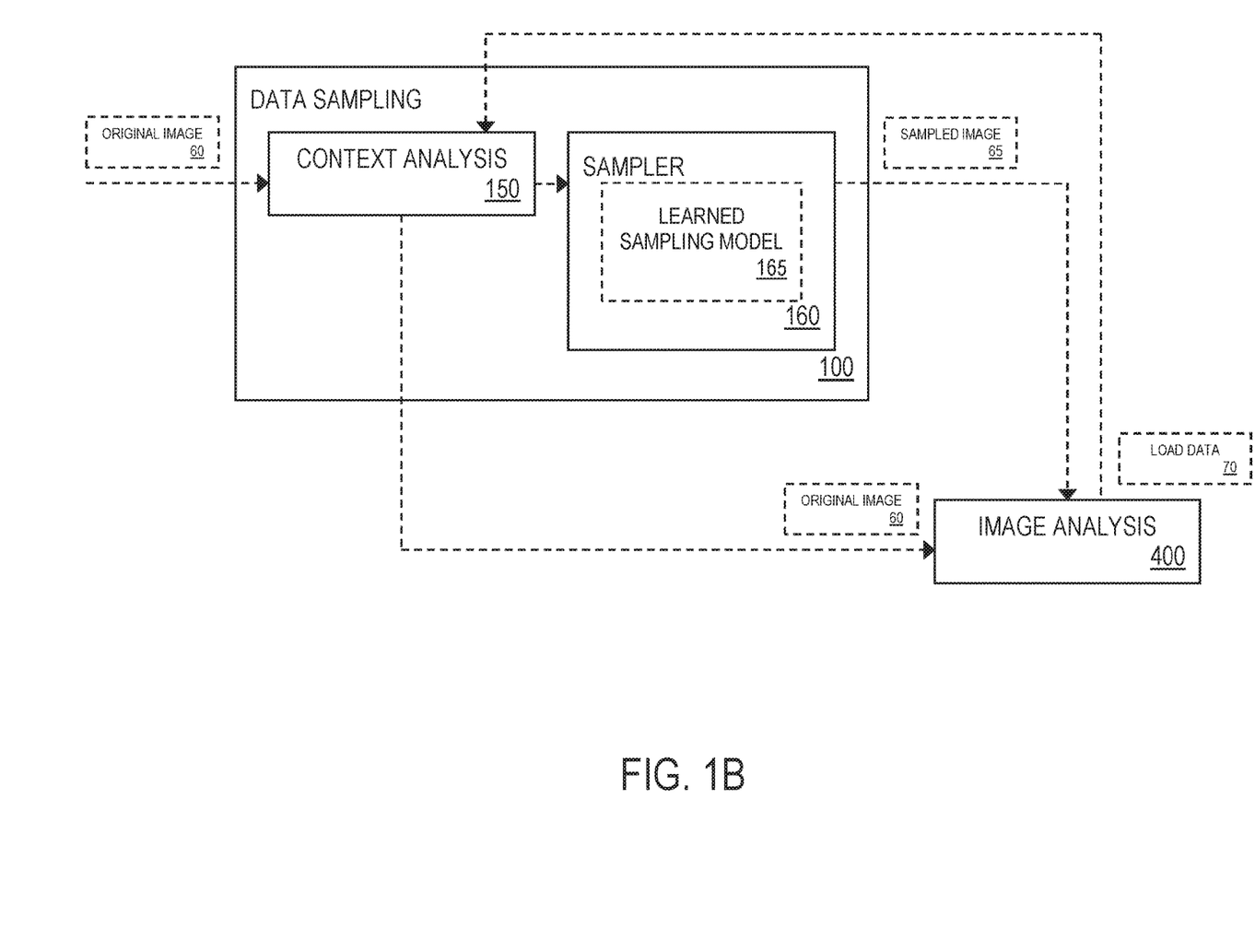
FIG. 1B illustrates a data sampling system in computing environments where data storage space is not an issue, in one or more embodiments.

The data sampling system 100 is configured to receive input data 50 comprising image data from a data storage environment 25. For example, the input data 50 may comprise, but is not limited to, at least one original image 60 (FIG. 1B). In one embodiment, the data storage environment 25 may comprise a single persistent storage device or a distribution of persistent storage devices.

In one embodiment, the data sampling system 100 is configured to determine, in response to receiving the input data 50, whether data sampling of the input data 50 is required (i.e., necessary). In one embodiment, the data sampling system 100 makes the determination based on a service level agreement (SLA) and/or current load of the image analysis system 400. For example, data sampling of the input data 50 is required if the current load of the image analysis system 400 is high (e.g., exceeds a pre-determined threshold).

If data sampling of the input data 50 is required, the data sampling system 100 determines an optimal image resolution for data sampling the input data 50 based on a learned sampling model (e.g., the learned sampling model trained by the training system 200), and performs the data sampling process on the input data 50 based on the optimal image resolution determined. The data sampling system 100 forwards sampled data resulting from the data sampling process as output data 55 to the image analysis system 400 for image analysis.

If data sampling of the input data 50 is not required, the data sampling system 100 bypasses the data sampling process and forwards the input data 50 as output data 55 to the image analysis system 400 for image analysis. For example, if the input data 50 comprises a set of original images, the data sampling system 100 forwards the original images itself as output data 55.

The computer framework 10 may be implemented in computing environments where data storage space is not an issue. For example, the data sampling system 100 may be used before job submission. Specifically, if an original image 60 is read from a storage device of the data storage environment 25 for image analysis, the data sampling system 100 may be used to perform a data sampling process on the original image 60. A sampled image 65 (FIG. 1B) resulting from the data sampling process may then be forwarded for image analysis instead of the original image 60. The original image 60 remains on the storage device.

In one embodiment, the computer framework 10 is a centralized computing architecture. In another embodiment, the computer framework 10 is a distributed computing architecture.

FIG. 1B illustrates the data sampling system 100 in computing environments where data storage space is not an issue, in one or more embodiments. As stated above, one or more applications may execute/operate on the one or more processor devices 110 (FIG. 1A) of the data sampling system 100. In one embodiment, the applications include, but are not limited to, a context analysis unit 150 and a sampler 160.

The context analysis unit 150 is configured to receive input data comprising at least one original image 60 (e.g., a high-resolution image, etc.). In response to receiving an original image 60, the context analysis unit 150 is configured to determine whether data sampling of the original image 60 is required based on contextual information. The contextual information may comprise, but is not limited to, at least one of the following: the original image 60, a SLA, or load data 70 from the image analysis system 400. The load data 70 is indicative of current load of one or more computation resources of the image analysis system 400 (e.g., consumption of central processing unit (CPU) resources, memory resources, input/output (I/O) bandwidth, network bandwidth, etc.). For example, based on the contextual information, the context analysis unit 150 may determine that data sampling of an original image 60 is required if either the SLA requires data sampling or the current load of the image analysis system 400 is high (e.g., exceeds a pre-determined threshold).

In response to determining data sampling of an original image 60 is required, the context analysis unit 150 is configured to forward the original image 60 to the sampler 160 for data sampling. In response to determining data sampling of an original image 60 is not required, the context analysis unit 150 is configured to forward the original image 60 as output data to the image analysis system 400 for image analysis.

In response to receiving an original image 60 from the context analysis unit 150, the sampler 160 is configured to determine an optimal image resolution for sampling the original image 60 based on a learned sampling model 165 (e.g., a learned sampling model trained by the training system 200), and perform a data sampling process on the original image 60 based on the optimal image resolution determined (i.e., sample the original image 60 at the optimal image resolution determined). The sampler 160 is configured to forward a sampled image 65 resulting from the data sampling process as output data to the image analysis system 400 for image analysis. Using the sampled image 65 during image analysis instead of the original image 60 reduces execution time (i.e., run-time) and memory consumption. Therefore, sampling the original image 60 in accordance with the optimal image resolution determined saves computational time and memory footprint during image analysis, while improving accuracy of the image analysis.

If data sampling of an original image 60 is not required, the context analysis unit forwards the input data 50 as output data to the image analysis system 400 for image analysis.

In one embodiment, the data sampling process performed by the sampler 160 involves applying linear and Gaussian interpolation for image resampling. In another embodiment, the data sampling process performed by the sampler 160 involves nearest neighbor interpolation for segmentation resampling (e.g., if the image analysis involves segmenting heart tissue from CT images).

In one embodiment, to reduce information loss in down-sampling an image (i.e., sampling a high-resolution image to a lower-resolution image), the sampler 160 minimizes a difference between spatial voxel size along different image dimensions in a resulting down-sampled image. For example, if down-sampling a 3D image by a factor of 8, instead of down-sampling any single dimension if the 3D image by a factor of 8, the sampler 160 down-samples an x dimension of the 3D image by a factor of 2, a y dimension of the 3D image by a factor of 2, and a z dimension of the 3D image by a factor of 2.

Figure 2A:
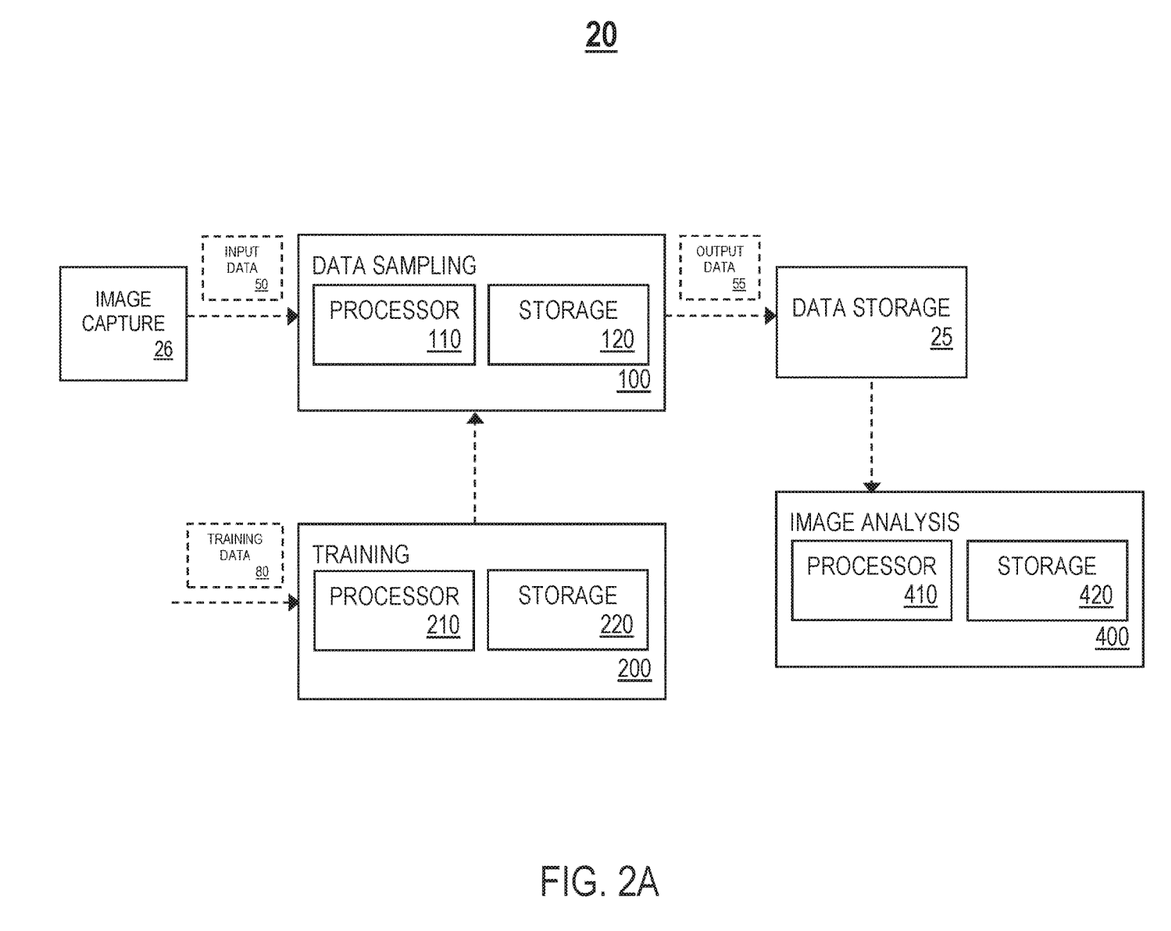
FIG. 2A illustrates another example computer framework for implementing optimal data sampling for image analysis, in one or more embodiments.

FIG. 2A illustrates another example computer framework 20 for implementing optimal data sampling for image analysis, in one or more embodiments. Similar to the computer framework 10 (FIG. 1A), the computer framework 20 comprises, but is not limited to, at least one of the following: (1) a training system 200, (2) a data sampling system 100, and (3) an image analysis system 400. Unlike the computer framework 10, however, the computer framework 20 may be implemented in computing environments where data storage space is an issue (e.g., bottlenecks may arise in the data storage space). For example, the data sampling system 100 may be used at data injection before storing data on a storage device of a data storage environment 25.

Specifically, the data sampling system 100 is configured to receive input data 50 comprising at least one original image 60 (FIG. 2B) from an image capture device 26. An image capture device 26 comprises one or more sensors for capturing image data. Examples of image capture devices 26 include, but are not limited to, a camera, a medical imaging device (e.g., a magnetic resonance imaging (MRI), a computed tomography (CT) scanner, etc.), etc. The data sampling system 100 performs a data sampling process on the input data 50, and forwards sampled data resulting from the data sampling process as output data 55 to a storage device of the data storage environment 25 for data storage. The original images 60 may be discarded. As the sampled data requires less data storage space than the original images 60, the data sampling system 100 reduces an amount of data storage space utilized for storing image data captured by the image capture device 26, thereby reducing data storage consumption and removing or reducing potential bottlenecks. The image analysis system 400 may retrieve the sampled data from the data storage environment 25 for image analysis.

Figure 2B:
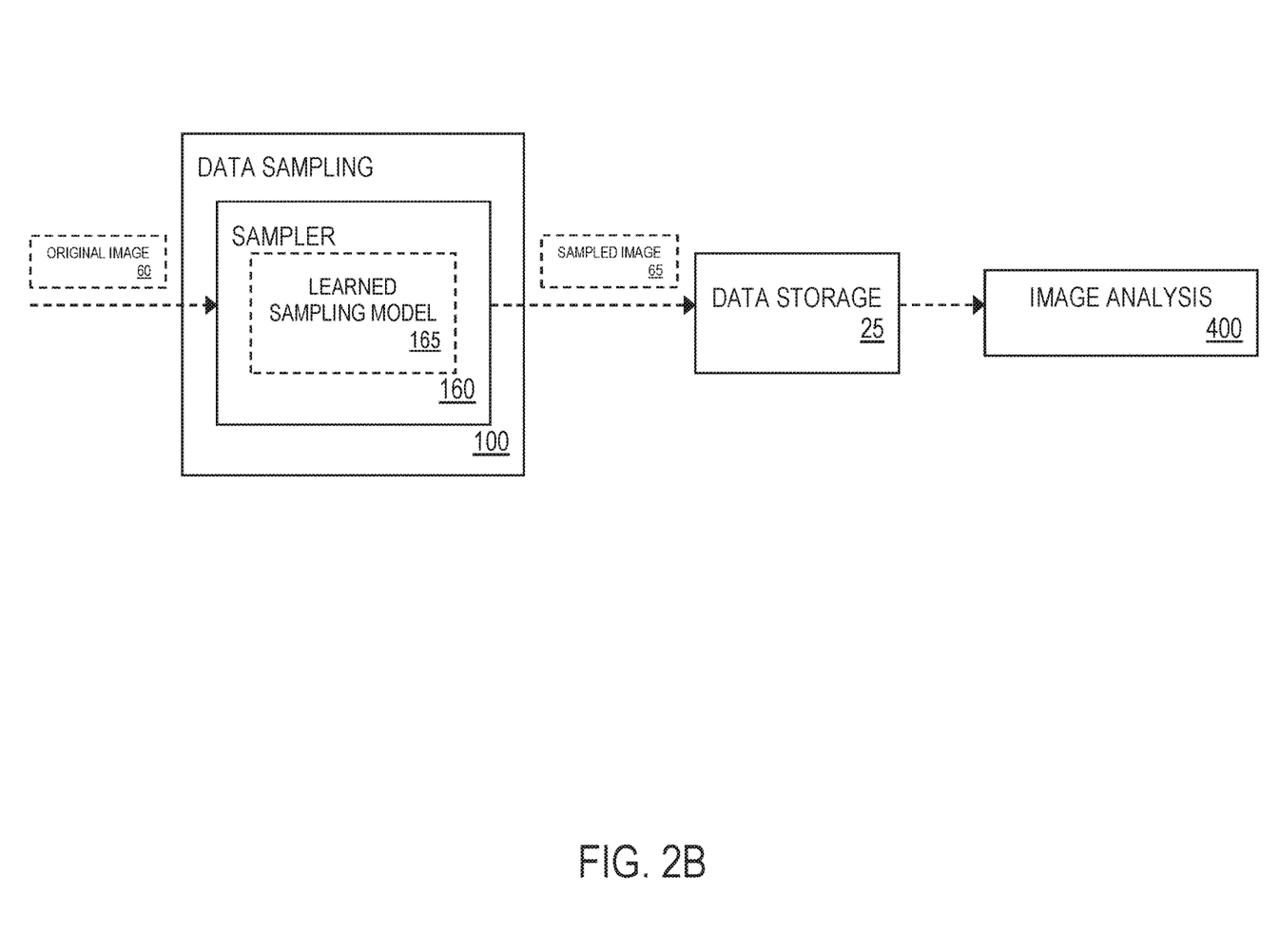
FIG. 2B illustrates the data sampling system in computing environments where data storage space is an issue, in one or more embodiments.

FIG. 2B illustrates the data sampling system 100 in computing environments where data storage space is an issue, in one or more embodiments. The sampler 160 is configured to receive input data comprising at least one original image 60 (e.g., a high-resolution image, etc.). In response to receiving an original image 60, the sampler 160 is configured to determine an optimal image resolution for sampling the original image 60 based on a learned sampling model 165 (e.g., a learned sampling model trained by the training system 200), and perform a data sampling process on the original image 60 based on the optimal image resolution determined (i.e., sample the original image 60 at the optimal image resolution determined). The sampler 160 is configured to forward a sampled image 65 resulting from the data sampling process as output data to the data storage environment 25 for data storage. The image analysis system 400 may retrieve the sampled image 65 from the data storage environment 25 for image analysis. Using the sampled image 65 during image analysis instead of the original image 60 reduces execution time (i.e., run-time) and memory consumption. Therefore, sampling the original image 60 in accordance with the optimal image resolution determined saves computational time and memory footprint during image analysis, while improving accuracy of the image analysis.

Figure 3:
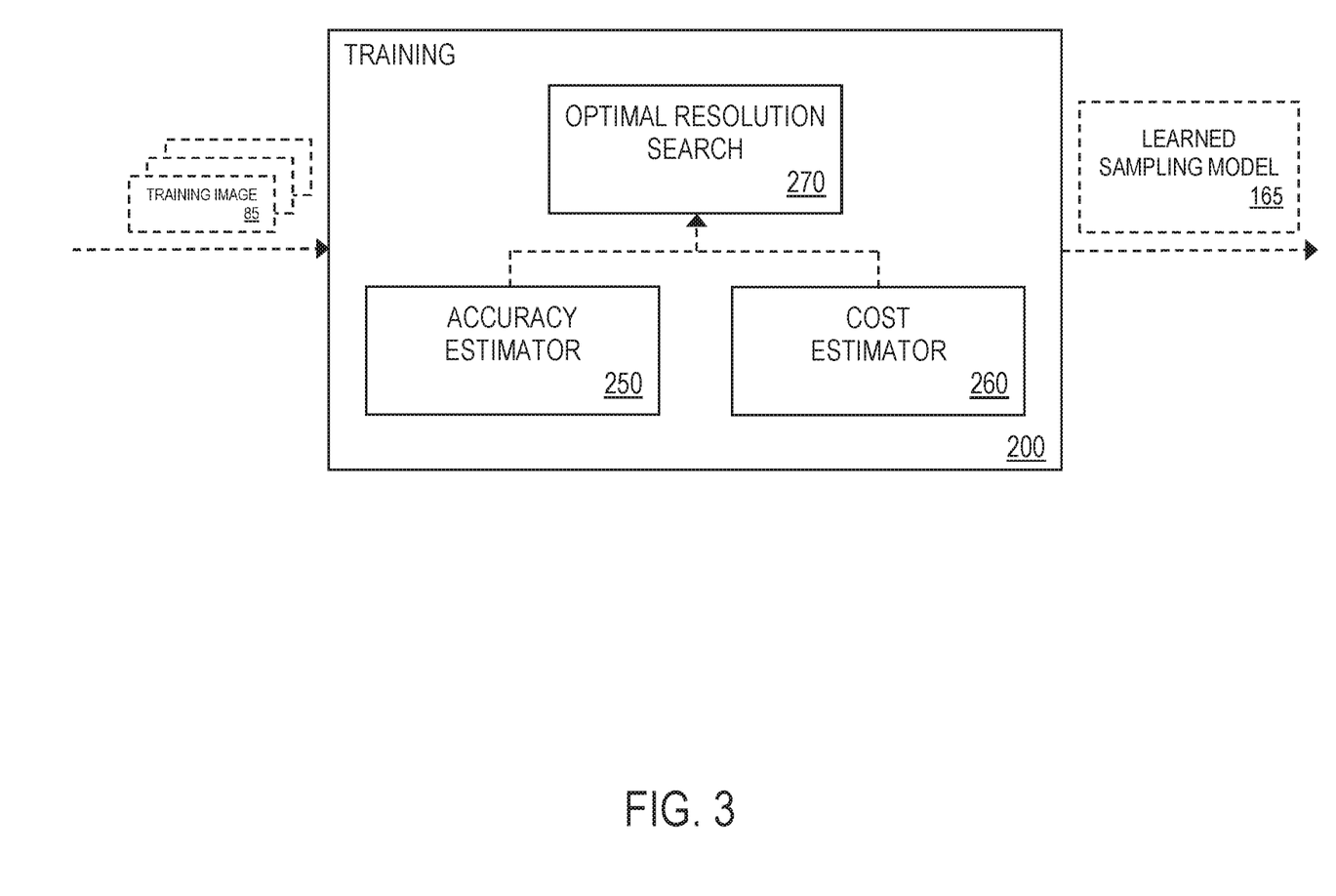
FIG. 3 illustrates a training system, in one or more embodiments.

FIG. 3 illustrates the training system 200, in one or more embodiments. As stated above, one or more applications may execute/operate on the one or more processor devices 210 (FIG. 1A) of the training system 200. In one embodiment, the applications include, but are not limited to, an accuracy estimator 250, a cost estimator 260, and an optimal resolution search unit 270.

The training system 200 is configured to receive training data comprising a set of training images 85 and corresponding ground truth labels for the training images 85. A training image 85 may comprise an original image 60 (FIG. 1B). The training system 200 is configured to create, initialize, and train a learned sampling model 165 based on the training images 85.

Specifically, given a particular image resolution, the accuracy estimator 250 is configured to project/estimate accuracy of image analysis on image data with the particular image resolution. Typically, image analysis of image data with higher resolution results in higher accuracy. Further, the cost estimator 260 is configured to project/estimate cost of image analysis of image data with the particular image resolution. In one embodiment, estimating cost of image analysis may comprise estimating cost of execution time and/or resource consumption associated with the image analysis. Typically, image analysis of image data with lower resolution results in faster execution time and lower resource consumption.

Based on estimates determined by the accuracy estimator 250 and the cost estimator 260 for the particular image resolution, the optimal resolution search unit 270 is configured to determine an optimal image resolution that image data with the particular image resolution may be sampled at (i.e., irreversibly compressed to). The optimal resolution represents a "sweet spot" that achieves ideal trade-offs between accuracy of image analysis and cost (e.g., execution time, resource consumption, etc.) of the image analysis. The training system 200 outputs a learned sampling model 165 indicative of different optimal image resolutions for data sampling images with different image resolutions. After training, the learned sampling model 165 may be loaded onto/downloaded to the data sampling system 100 if the training system 200 and the data sampling system 100 reside on different devices.

Let r generally denote an image resolution. Let $E(r)$ generally denote a cost model/function for estimating cost of image analysis of image data with image resolution r. For expository purposes, the term "cost curve" as used herein generally refers to a curve representing the cost model/function $E(r)$. In one embodiment, the cost model/function $E(r)$ is a linear model/function that estimates execution time of image analysis. The cost model/function $E(r)$ may be fitted via regressions using training data (e.g., as few as 2 data points). Let t generally denote a target/desired execution time of image analysis.

Let $ACC(r)$ generally denote an accuracy model/function for estimating accuracy of image analysis of image data with image resolution r. For expository purposes, the term "accuracy curve" as used herein generally refers to a curve representing the accuracy model/function $ACC(r)$. As a similar class of images follow roughly the same accuracy model/function $ACC(r)$, a shape of the accuracy curve may be explored using a sample image. Assume the shape of the accuracy curve is concave or monotonically increasing (i.e., the function $ACC(r)$ is a concave function or monotonically increasing function).

Let find_resolution_with_max_acc( ) generally denote a function/method for determining an image resolution that yields maximum accuracy. Let A generally denote a target/desired accuracy (i.e., a pre-defined threshold for accuracy), and let find_resolution_with_acceptable_acc(A) generally denote a function/method for determining an image resolution that meets the target/desired accuracy A.

Table 1 below provides an example algorithm the optimal resolution search unit 270 may apply to determine an optimal image resolution for data sampling.

TABLE 1

Step 1: Select a training image i with image resolution r. Select an initial lower image resolution r1, wherein r1 = r − Δ, and Δ is very small.
Step 2: Sample the training image i at the image resolution r1, producing a lower resolution image i1 with image resolution r1.
Step 3: Perform image analysis on the images i and i1. Measure accuracy acc1 of image analysis of the image i1, wherein acc1 = ACC(r1). Measure accuracy acc2 of image analysis of the image i, wherein acc2 = ACC(r).
Step 4: Solve $E(r^{}) = t$ (i.e., $r^{} = E^{-1}(t)$)
Step 5: If acc2 < acc1
   THEN go to Step 6 (i.e., on downward slope of the accuracy curve)
   ELSE go to Step 7 (i.e., on upward slope of the accuracy curve)
Step 6: $r^* = $ find_resolution_with_max_acc( );
   RETURN min ($r^*$, $r^{**}$) (i.e., optimal image resolution is min ($r^*$, $r^{**}$))
Step 7: $r^* = $ find_resolution_with_acceptable_acc(A);
   Solve $y = kr^* + (1 - k)r^{**}$, wherein y is a value between $r^*$ and $r^{**}$, and 0 < k < 1 (if k = 0.5, both accuracy and cost are equally important; if k > 0.5, the larger k is, the more important accuracy is relative to cost)
   RETURN y (i.e., optimal image resolution is y)

Let M(r) generally denote a memory model/function for estimating memory consumption (i.e., consumption of memory resources) of image analysis of image data with image resolution r. In one embodiment, the memory model/function M(r) is a linear model/function. Let m generally denote a target/desired amount of memory consumption during image analysis. In one embodiment, in addition to execution time, constraints associated with cost of image analysis may further factor in memory consumption. For example, Step 4 in Table 1 provided above may re-written as follows: $r^{**}=\min(E^{-1}(t), M^{-1}(m))$. In another embodiment, other types of cost models/functions may be utilized, such as cost models/functions that estimate consumption of other computation resources (e.g., consumption of CPU resources, I/O bandwidth, network bandwidth, etc.) utilized during image analysis.

In one embodiment, the training images 85 received by the training system 200 are application-dependent. For example, the training images 85 comprise CT images if an application utilizing the learned sampling model 165 involves segmenting heart tissue from CT images. In one embodiment, training images 85 and original images 60 are sampled from the same distribution.

Figure 4:
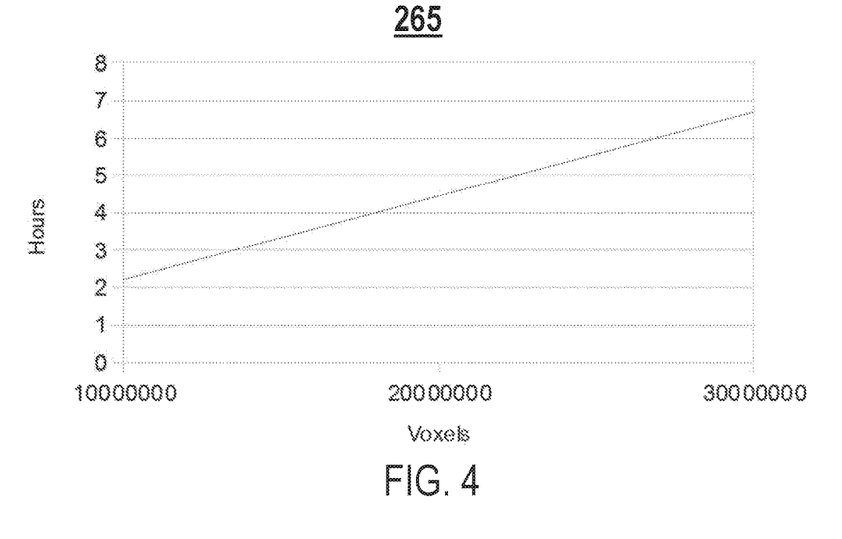
FIG. 4 is an example cost model, in one or more embodiments.

FIG. 4 is an example cost model 265, in one or more embodiments. Specifically, the cost model 265 illustrates execution time of image analysis relative to image resolution. A horizontal axis of the cost model 265 represents image resolution expressed in voxels. A vertical axis of the cost model 265 represents execution time of image analysis expressed in hours. As shown in FIG. 4, execution time increases as image resolution increases (i.e., higher image resolution results in slower execution time).

Figure 5:
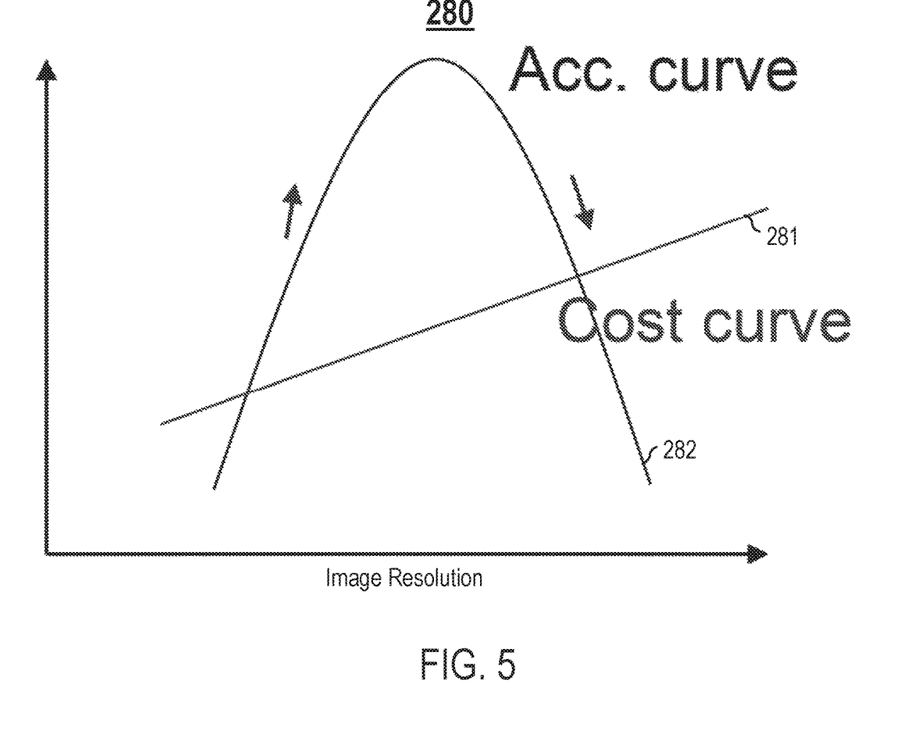
FIG. 5 is an example graph illustrating accuracy and cost of image analysis relative to image resolution, in one or more embodiments.

FIG. 5 is an example graph 280 illustrating accuracy and cost of image analysis relative to image resolution, in one or more embodiments. Specifically, the graph 280 comprises a cost curve 281 ("Cost curve") representing cost of image analysis relative to image resolution, and an accuracy curve 282 ("Acc. curve") representing accuracy of the image analysis relative to image resolution. A horizontal axis of the graph 280 represents image resolution.

Figure 6:
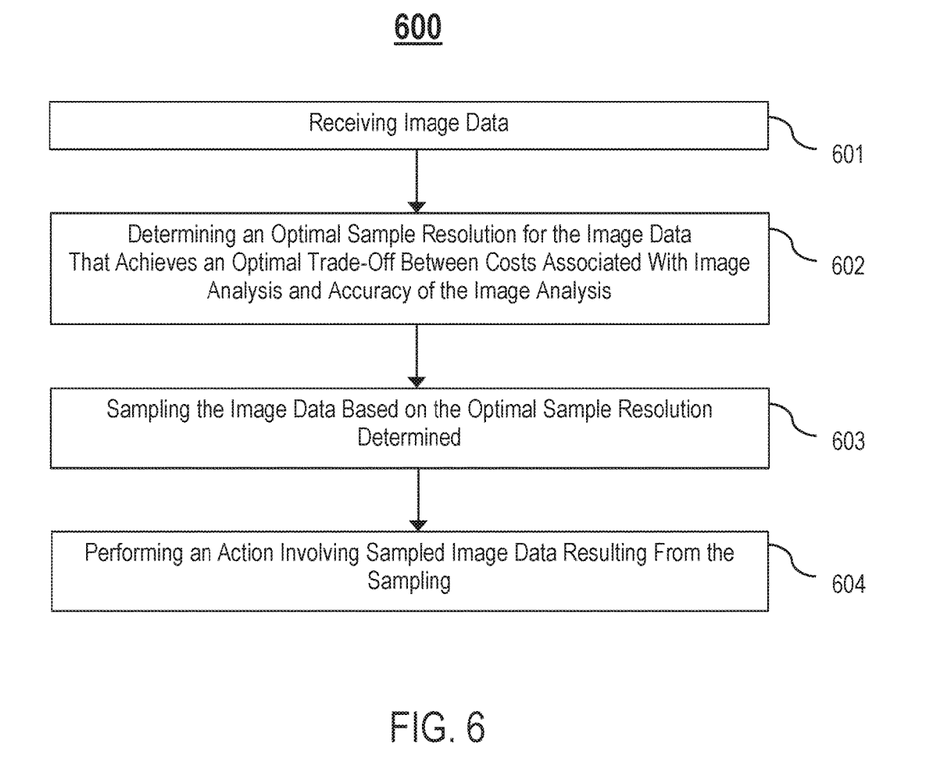
FIG. 6 is a flowchart of an example process for optimal data sampling for image analysis, in one or more embodiments.

FIG. 6 is a flowchart of an example process 600 for optimal data sampling for image analysis, in one or more embodiments. In process block 601, receive image data. For example, the image data may comprise an original image.

In process block 602, determine an optimal sample resolution (i.e., optimal image resolution) for sampling the image data. The optimal sample resolution achieves an optimal trade-off between costs associated with image analysis (e.g., execution time, memory consumption, CPU consumption, I/O bandwidth consumption, network bandwidth consumption, etc.) and accuracy of the image analysis.

In process block 603, sample the image data at the optimal sample resolution determined.

In process block 604, perform an action involving resulting sampled image data. For example, the action may involve writing the sampled image data to a data storage environment if data sampling is performed at data injection. As another example, the action may involve forwarding the sampled image data for image analysis if data sampling is performed before job submission.

In one embodiment, process blocks 601-604 may be performed by the data sampling system 100.

Figure 7:
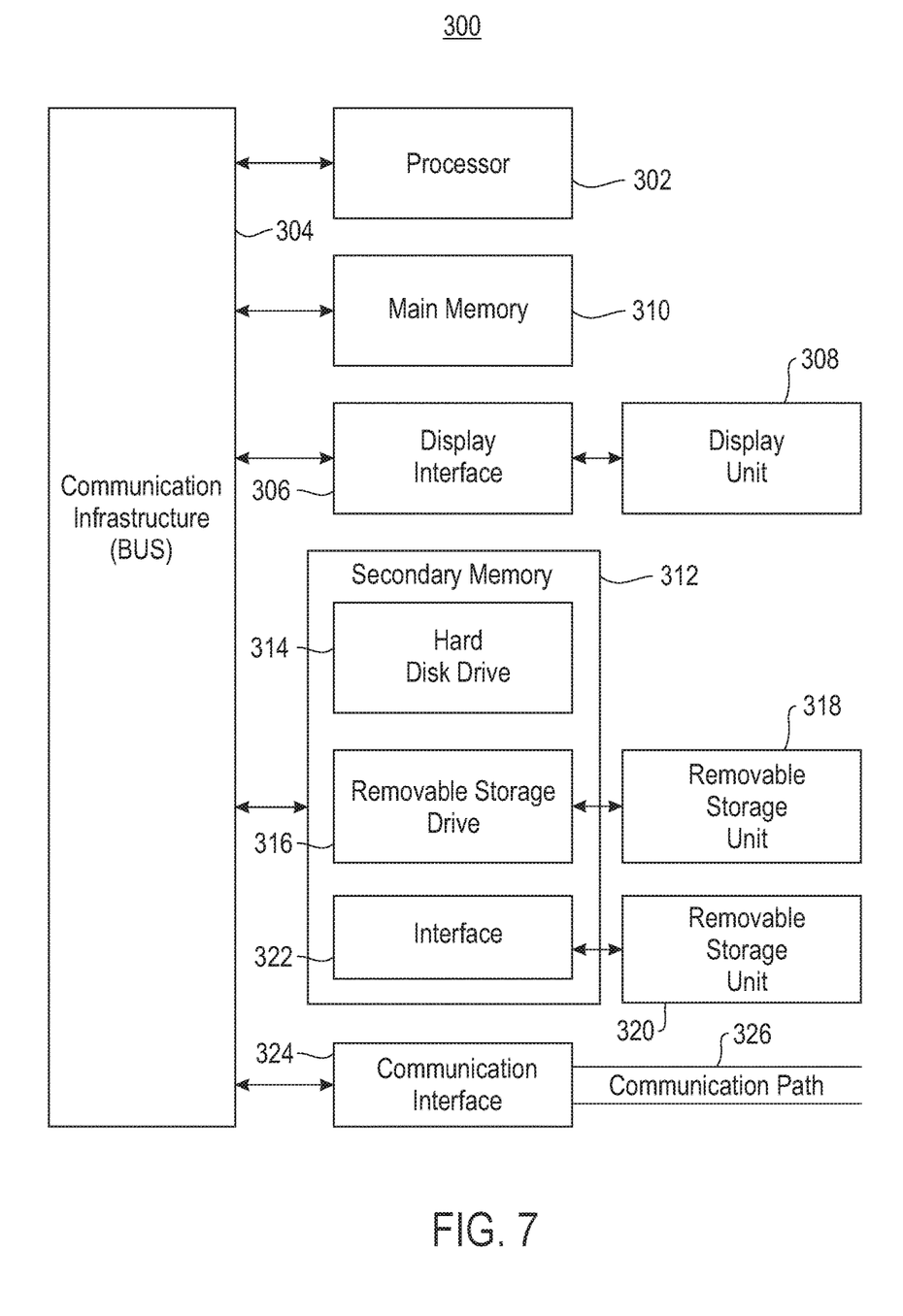
FIG. 7 is a high level block diagram showing an information processing system useful for implementing an embodiment of the present invention.

FIG. 7 is a high-level block diagram showing an information processing system comprising a computer system 300 useful for implementing the disclosed embodiments. Each system 100, 200, 400 may be implemented using a computer system 300. The computer system 300 includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving image data with a first image resolution;
   estimating accuracy of image analysis on the image data with the first image resolution;
   determining an optimal image resolution for sampling the image data based on the estimated accuracy of image analysis and a learned model trained to determine different optimal image resolutions for different images with different image resolutions, wherein the optimal image resolution is lower than the first image resolution;
   sampling the image data at the optimal image resolution; and
   performing image analysis on the sampled image data resulting from the sampling.

2. The method of claim 1, wherein the optimal image resolution represents an optimal trade-off between the estimated accuracy of image analysis and one or more costs associated with the image analysis, and the optimal image resolution satisfies at least one of a target accuracy or a target cost.

3. The method of claim 2, wherein the learned model is trained based on an accuracy model for estimating accuracy of image analysis and one or more cost models for estimating the one or more costs associated with the image analysis.

4. The method of claim 3, wherein the accuracy model is one of a concave function or a monotonically increasing function.

5. The method of claim 3, wherein the one or more cost models comprise a linear model fitted via regressions using training data.

6. The method of claim 3, wherein the one or more cost models estimate at least one of the following costs associated with the image analysis: execution time, memory consumption, central processing unit (CPU) consumption, input/output (I/O) bandwidth consumption, or network bandwidth consumption.

7. The method of claim 2, wherein the sampling the image data at the optimal image resolution comprises down-sampling different image dimensions of the image data by different factors.

8. The method of claim 1, further comprising:
   storing the sampled image data instead of the image data on a storage device, thereby reducing data storage consumption.

9. The method of claim 1, wherein the performing the image analysis on the sampled image data instead of the image data reduces computational time and resource consumption.

10. A system, comprising:
    at least one processor; and
    a non-transitory processor-readable memory device storing instructions that when executed by the at least one processor causes the at least one processor to perform operations including:
      receiving image data with a first image resolution;
      estimating accuracy of image analysis on the image data with the first image resolution;
      determining an optimal image resolution for sampling the image data based on the estimated accuracy of image analysis and a learned model trained to determine different optimal image resolutions for different images with different image resolutions, wherein the optimal image resolution is lower than the first image resolution;
      sampling the image data at the optimal image resolution; and
      performing image analysis on the sampled image data resulting from the sampling.

11. The system of claim 10, wherein the optimal image resolution represents an optimal trade-off between the estimated accuracy of image analysis and one or more costs associated with the image analysis, and the optimal image resolution satisfies at least one of a target accuracy or a target cost.

12. The system of claim 11, wherein the learned model is trained based on an accuracy model for estimating accuracy of image analysis and one or more cost models for estimating the one or more costs associated with the image analysis.

13. The system of claim 12, wherein the accuracy model is one of a concave function or a monotonically increasing function.

14. The system of claim 12, wherein the one or more cost models comprise a linear model fitted via regressions using training data.

15. The system of claim 12, wherein the one or more cost models estimate at least one of the following costs associated with the image analysis: execution time, memory consumption, central processing unit (CPU) consumption, input/output (I/O) bandwidth consumption, or network bandwidth consumption.

16. The system of claim 11, wherein the sampling the image data at the optimal image resolution comprises downsampling different image dimensions of the image data by different factors.

17. The system of claim 10, wherein the operations further comprise:
storing the sampled image data instead of the image data on a storage device, thereby reducing data storage consumption.

18. The system of claim 10, wherein the performing the image analysis on the sampled image data instead of the image data reduces computational time and resource consumption.

19. A non-transitory computer readable storage medium including instructions to perform a method comprising:
receiving image data with a first image resolution;
estimating accuracy of image analysis on the image data with the first image resolution;
determining an optimal image resolution for sampling the image data based on the estimated accuracy of image analysis and a learned model trained to determine different optimal image resolutions for different images with different image resolutions, wherein the optimal image resolution is lower than the first image resolution;
sampling the image data at the optimal image resolution; and
performing image analysis on the sampled image data resulting from the sampling.

20. The computer readable storage medium of claim 19, wherein the optimal image resolution represents an optimal trade-off between the estimated accuracy of image analysis and one or more costs associated with the image analysis.

* * * * *